W. W. PRICE.
PIPE COUPLING PACKING.
APPLICATION FILED SEPT. 8, 1910.
980,671.
Patented Jan. 3, 1911.
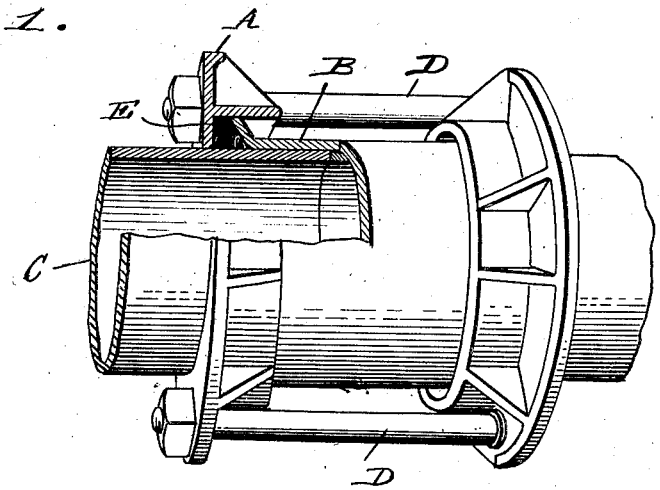
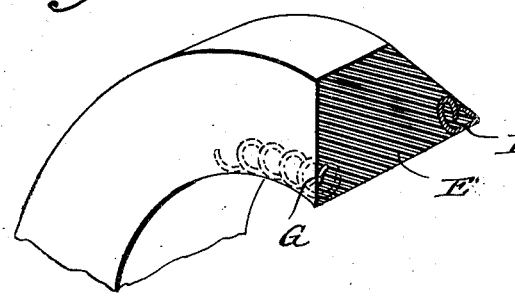
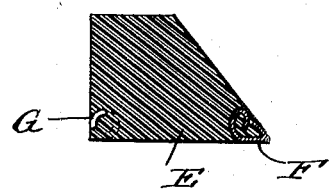
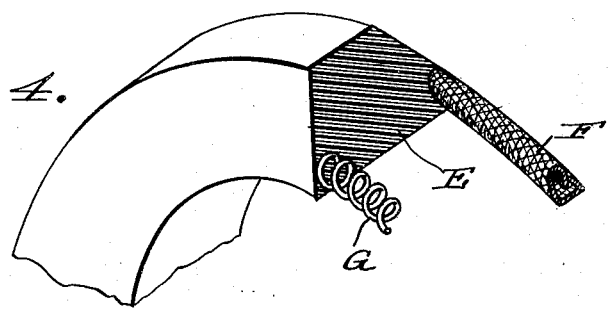
Witnesses
Inventor
William W. Price
By Church & Church
his Attorneys

UNITED STATES PATENT OFFICE.

WILLIAM W. PRICE, OF DAYTON, OHIO.

PIPE-COUPLING PACKING.

980,671.　　　　　Specification of Letters Patent.　　　Patented Jan. 3, 1911.

Application filed September 8, 1910. Serial No. 581,023.

*To all whom it may concern:*

Be it known that I, WILLIAM W. PRICE, a citizen of the United States, residing at Dayton, in the county of Montgomery and State of Ohio, have invented certain new and useful Improvements in Pipe-Coupling Packings; and I do hereby declare the following to be a full, clear, and exact description of the same, reference being had to the accompanying drawings, forming a part of this specification, and to the figures and letters of reference marked thereon.

This invention relates to pipe couplings and more especially to that type of coupling used in connection with mains for conveying gas under pressure.

The objects of the invention are to provide a coupling which will effectually seal the joint against escape of gas and of such construction as will prevent deterioration of the elastic packing materials through the action of the gas itself or of the destructive elements carried with or contained in the gas.

Great difficulty has been encountered in making couplings in gas mains permanent where elastic packing materials are employed, this being in a great measure due to the destructive action of the gas and elements carried therewith or existing therein as impurities, the disintegration of the elastic packing material not only permitting of the formation of channels or passages for the escape of gas but the body of the material is to a certain degree decomposed and the pressure elements of the metallic portions of the coupling are ineffective to retain the same in position under the required pressure. In overcoming these difficulties a packing ring is provided which, in its sealing edge where the gases or products carried with the gases come in contact therewith, has incorporated therein a flexible fibrous material which may be of nonelastic character but which is unaffected by the gas or materials which are destructive to the elastic material of which the body of the packing is composed. In connection with a ring having its exposed edge or face thus protected, there is employed a means for distributing the pressure of the clamping elements through the body of the packing and for preventing the squeezing out of the elastic material through the interstices of the joint, such means being also incorporated in the body of the packing ring itself but in proximity to the opposite face from that which is protected against the destructive influences of the gas.

Referring to the accompanying drawings—Figure 1 is a sectional perspective view of a pipe coupling embodying the present invention. Fig. 2 is an enlarged sectional perspective of a portion of the packing ring. Fig. 3 is a transverse section through the ring, and Fig. 4 is a view corresponding to Fig. 2 but with the elastic material partly removed to show the reinforcement in the rear face of the ring and the protecting fabric in the front face or edge of the ring.

Like letters of reference in the several figures indicate the same parts.

The metal portions of the coupling, as shown in Fig. 1, may conveniently consist of a clamping ring or pressure member A, a sleeve B, which bridges the joint at the end of the pipe C and bolts D which connect the clamping ring A at one end of the sleeve with a coöperating clamping ring which may be located at the opposite end of the sleeve, but it will be understood that the particular construction of these parts may be varied to suit the conditions of use without departing from the present invention.

In the type of coupling illustrated, the end of the sleeve B forms with the pipe C a recess which tapers down to the space between the pipe and body of the sleeve and the pressure ring A forms the outer wall of said space, whereby an elastic packing ring confined in said space will be forced by the pressure member A into the tapering chamber, thereby effectually sealing the joint against the escape of gaseous products.

The packing ring itself is formed with its body portion E of the elastic vulcanized india rubber which, in general cross-sectional contour, is made to substantially conform to the cross-sectional shape of the chamber. The front face or edge of this ring E which is the face or edge necessarily exposed to the action of the gas and elements carried therewith, has incorporated therein and vulcanized therewith, an indestructible fabric preferably in the form of a roll of woven asbestos fiber F which may conveniently have portions of the rubber itself incorporated between and within the threads or strands whereby the whole protecting edge or face and the body of the ring are made a substantially integral structure, but the asbestos fabric is of sufficient sectional area and density to form an effectual barrier against the action of the destructive elements of the gas upon the elastic body of the ring. The flexible asbestos fabric being backed up by the rubber of the ring will form an effectual seal, but any possible interstices which might be formed or tend to form through the fabric are closed by the rubber backing forcing the fabric forwardly and into intimate contact with the confining members.

In packings of this character which are designed to withstand high pressures, the clamping member has to be advanced with great power, and there is a tendency under such extreme pressures of the rubber flowing out in the cracks of the joints and in this way not only relieving the pressure on the packing but tending to ultimately destroy the ring itself. To overcome this difficulty, a metal pressure distributing element of relatively large size is incorporated directly in the body of the packing ring and preferably in proximity to the inner and rear faces of the ring or, in other words, in the inner rear corner. This pressure distributing element may conveniently take the form of a metal spiral G which, as will be readily understood, does not reduce the flexibility and elasticity of the packing ring but pressure brought to bear upon the rear face of the ring will be distributed through the ring by the metal coil and the coil will effectually prevent any of the body of the ring from squeezing back at the inner rear corner.

In practice it is found that the protected front face or edge and the inner rear corner are rendered somewhat harder than the body of the ring by the inclusion therein of the asbestos fabric and metal insert, but the flexibility of the ring whereby it may conform to the shape of the pipe or confining chamber and intermediate gas pipe is not reduced as compared with the ordinary rubber rings.

With couplings embodying the present invention it is found that they may be buried, are practically permanent or have a life which substantially equals the life of the gas main and metallic parts.

Having thus described my invention, what I claim as new and desire to secure by Letters Patent of the United States, is—

1. A packing for pipe couplings consisting of a solid elastic vulcanized rubber ring having the front face thereof parallel with the axis of the ring formed of woven asbestos fabric a portion of which is incorporated in the front portion of the ring prior to vulcanization whereby a highly elastic body is provided and said body is protected from the destructive action of substances confined by the packing.

2. A packing for pipe couplings, consisting of an elastic ring of vulcanized rubber of substantially wedge-shape in cross-section and having the apex only of the wedge composed of a roll of asbestos fabric incorporated in the rubber by vulcanization.

3. A packing for pipe couplings, consisting of a ring of elastic vulcanized substance having incorporated in one face thereof a protecting fabric of asbestos fiber and in the opposite face thereof a flexible metallic pressure distributing member.

4. A packing for pipe coupling, consisting of a ring of elastic vulcanized rubber having incorporated in one face thereof a flexible protecting fabric of asbestos fiber and in proximity to the opposite face thereof having a metallic spiral incorporated therein and forming a pressure distributing member.

WILLIAM W. PRICE.

Witnesses:
R. E. CONDIT,
F. J. MORAN.